(12) United States Patent
Cremezi et al.

(10) Patent No.: US 12,308,562 B2
(45) Date of Patent: May 20, 2025

(54) PROTECTIVE ASSEMBLY FOR CONNECTORS, SYSTEM AND VEHICLE PROVIDED WITH SUCH AN ASSEMBLY

(71) Applicant: AIRBUS HELICOPTERS, Marignane (FR)

(72) Inventors: Alain Cremezi, Marseilles (FR); Isabelle Jacquey, Eyguieres (FR); Gael Hautot, Velaux (FR)

(73) Assignee: AIRBUS HELICOPTERS, Marignane (FR)

( * ) Notice: Subject to any disclaimer, the term of this patent is extended or adjusted under 35 U.S.C. 154(b) by 216 days.

(21) Appl. No.: 17/738,617

(22) Filed: May 6, 2022

(65) Prior Publication Data

US 2022/0360015 A1 Nov. 10, 2022

(30) Foreign Application Priority Data

May 6, 2021 (FR) ...................................... 2104780

(51) Int. Cl.
| | | |
|---|---|---|
| *H01R 13/44* | (2006.01) | |
| *B60L 53/16* | (2019.01) | |
| *B60R 16/02* | (2006.01) | |
| *B60R 16/08* | (2006.01) | |
| *G02B 6/38* | (2006.01) | |
| *H01R 13/52* | (2006.01) | |

(Continued)

(52) U.S. Cl.
CPC .......... *H01R 13/5213* (2013.01); *B60L 53/16* (2019.02); *B60R 16/02* (2013.01); *B60R 16/08* (2013.01); *G02B 6/3849* (2013.01); *H01R 13/44* (2013.01); *F16L 57/005* (2013.01); *H01R 13/623* (2013.01); *H01R 13/625* (2013.01); *H01R 2201/26* (2013.01)

(58) Field of Classification Search
None
See application file for complete search history.

(56) References Cited

U.S. PATENT DOCUMENTS 2,962,688 A * 11/1960 Werner ............... H01R 13/5219
439/654
3,976,311 A * 8/1976 Spendlove .......... A61M 39/162
604/533

(Continued)

FOREIGN PATENT DOCUMENTS

FR 3080684 A1 11/2019

OTHER PUBLICATIONS

French Search Report for French Application No. FR2104780, Completed by the French Patent Office, Dated Dec. 2, 2021, 9 pages.

(Continued)

*Primary Examiner* — Tho D Ta
(74) *Attorney, Agent, or Firm* — BROOKS KUSHMAN P.C.

(57) ABSTRACT

A protective assembly provided with a hollow first cap with a first cavity configured to house a first connector and a second cap. The second cap has a hollow portion delimiting a second cavity configured to house a second connector to be connected to the first connector. The first cavity is shaped to match an outer casing of the hollow portion. The second cap penetrates into the first cavity in a sealed manner, in a connected mode, isolating the first cavity and the second cavity from an external environment.

19 Claims, 4 Drawing Sheets

(51) Int. Cl.
    *F16L 57/00*        (2006.01)
    *H01R 13/623*       (2006.01)
    *H01R 13/625*       (2006.01)

(56)                References Cited

U.S. PATENT DOCUMENTS 5,697,810  A  *  12/1997  Barry ................... B60D 1/62
                                                           439/503
    6,005,300  A  *  12/1999  Kelly ................. B60R 16/0207
                                                            315/83
    6,273,729  B1 *   8/2001  Kelly ................. B60R 16/0207
                                                            439/36
    7,442,077  B2    10/2008  Peress et al.
    7,789,679  B2 *   9/2010  Wu .................... H01R 13/5213
                                                           439/135
    9,653,838  B2     5/2017  Lewis et al.
   10,340,628  B2     7/2019  Borkar et al.
   2007/0012474 A1    1/2007  McNutt et al.
   2017/0069997 A1    3/2017  Markefka

OTHER PUBLICATIONS

Communication Pursuant to Article 94(3) EPC for European Application No. 22169044.9-1201, dated May 14, 2024, 5 Pages.
Anonymous, "Hydralik Kupplung 12-L Stecker für Traktor Lader / 21,93 EUR, 21, 93 EUR," May 9, 2019 (May 9, 2019), XP093160268, Accessed via Internet: URL: https://www.hydrauliktechnik24.de/2-x-Hydraulik-Kupplung-12-L-Stecker-Muffe-Traktor-Lader, 2 Pages.

* cited by examiner

PROTECTIVE ASSEMBLY FOR CONNECTORS, SYSTEM AND VEHICLE PROVIDED WITH SUCH AN ASSEMBLY

CROSS REFERENCE TO RELATED APPLICATIONS

This application claims priority to French patent application No. FR 21 04780 filed on May 6, 2021, the disclosure of which is incorporated in its entirety by reference herein.

TECHNICAL FIELD

The present disclosure relates to a protective assembly for connectors, a connection system provided with the connectors and with such an assembly, and a vehicle provided with such an assembly.

BACKGROUND

An aircraft may comprise various members connected to one another in order to convey a light signal, a fluid, an electrical signal carrying data, or indeed electrical power. For example, a piece of equipment may be connected to an electrical braid conveying an electric current and/or a bus carrying data. The term "piece of equipment" refers to an object using the electrical power, the electrical signal, the light or the fluid that is received. Such a piece of equipment may be a computer, a screen, etc. According to another example, two electrical cables are connected to each other. According to another example, one optical fiber is connected to another optical fiber or to a piece of equipment, or two pipes are connected to each other.

Various known connection systems comprise connectors for connecting two members electrically, optically or fluidically.

A first simple electrical connection system comprises a lug connector and a screw connector. An aircraft conventionally comprises metal braids leading to a fastening lug at each end. During maintenance operations, the lugs should be disconnected and then reconnected at the end of maintenance according to a procedure requiring surface preparation and an electrical continuity check.

A second connection system referred to as a "quick-connect" system comprises two connectors to be connected to each other by means of a simple manipulation. In particular, it is possible to have a connector having at least one male part to be inserted at least partially into a cavity of a female connector. By way of illustration, the male connector may comprise a metal rod to be inserted into a metal sheath of the female connector. The connectors of a quick-connect system may be simple or relatively complex in order to ensure that these connectors always remain connected to each other, in particular in an environment that is subject to vibrations and, in particular, within an aircraft. For example, such a quick-connect system includes a bayonet fastener. Such a bayonet fastener may include a pin secured to one connector and an L-shaped groove secured to the other connector into which the pin may be inserted.

A quick-connect system is therefore simpler to use than the first connection system. However, when the connectors of a quick-connect system are not connected to each other, these connectors are not protected from the outside environment. Dust or other particles may then enter the connectors. These particles can then interfere with the subsequent transmission of data or electrical power, or indeed with the circulation of light or fluid. Furthermore, a defect caused by a particle may be difficult to detect when, visually, the connectors are correctly assembled.

However, members provided with quick-connect systems may well be disconnected. In particular, optional members may be provided with this type of quick-connect system so as to be stored when not in use. By way of example, a camera may be arranged on a helicopter only during particular missions. These members may in particular be stored in places that may be full of polluting particles.

In order to protect a connector, a dust cap may be arranged on the disconnected connector. However, it should be possible to remove the cap quickly in order to allow immediate use when a connector is disconnected.

Document U.S. Pat. No. 10,340,628 B2 describes a cap connected to a connector via a lanyard.

Although beneficial, a cap may also gather polluting particles when this cap is not arranged on the connector. When the cap is then arranged on the connector in order to protect it, this cap may transmit particles to the connector. An operator must therefore be sure to clean the cap before arranging it on a connector.

Document U.S. Pat. No. 9,653,838 describes a connection system provided with two connectors each carrying a cap and a hook. When the connectors are connected to each other, the caps are positioned facing each other.

Document US 2017/069997 describes an assembly comprising a plug and a socket. The plug includes a housing defining a connection opening. Furthermore, the socket includes a cover hinged to the housing in order to close the connection opening when the plug is absent. Moreover, the cover rests on a support of the plug when this plug is inserted into the socket.

Document US 2007/012474 discloses a cap connected to a bayonet connector.

Document U.S. Pat. No. 7,442,077 describes a cable provided with a male connector connected to a corresponding closure and a female connector connected to a corresponding female closure.

This system is beneficial but relatively complex.

SUMMARY

An object of the present disclosure is therefore to propose a relatively simple alternative assembly for protecting a connector without polluting it.

According to the disclosure, a protective assembly comprises a hollow first cap provided with a first cavity configured to house a first connector, said protective assembly being provided with a second cap, the second cap comprising a hollow portion delimiting a second cavity configured to house a second connector to be connected to the first connector.

The first cavity is shaped to match an outer casing of the hollow portion, said second cap penetrating into the first cavity in a sealed manner, in a connected mode, isolating the first cavity and the second cavity from an external environment.

The expression "the first cavity is shaped to match an outer casing of the hollow portion" means that the hollow portion as such can be inserted into the first cavity, the first cavity and the second cavity being isolated from the external environment by shape interference and/or by a seal.

This assembly can protect various types of connectors and, in particular, connectors of quick-connect systems arranged both on equipment and on metal braids, optical fibers or the like. This assembly can in particular protect a system provided with a first connector contained in a volume that can contain the second connector.

For example, the connectors are of the type described in document FR 3 080 684.

The connectors may be arranged on a functional link, i.e., a link exchanging an optical or electrical signal or a fluid with the associated connector. However, one of the connectors may be a holder base to which the other connector is connected during storage, for example.

Irrespective of the nature of the connectors, the assembly comprises a first cap delimiting a first cavity shaped in particular to match a first connector. The first cap can thus be fitted over the first connector in order to protect it. Similarly, the assembly includes a second cap that can be fitted over a second connector.

Furthermore, the first cap and the second cap are dimensioned so as to be inserted into each other in such a way as to isolate the inside of the caps from the air and/or water of an external environment. The second cap as such can be fitted tightly into the first cap so as to prevent foreign particles from entering the first cap and the second cap.

The first cap and the second cap thus protect each other in the connected mode. The first cap prevents particles from entering the second cavity of the second cap, and the second cap prevents particles from entering the first cavity of the first cap.

If a quick-connect connector is connected to a metal braid, the corresponding cap protects the contacts of the connector when in a disconnected mode.

On an aircraft, the first cap and the second cap protect each other during flights and protect the connectors when the connectors and any associated links are in storage. The caps therefore do not become polluted when the first connector is connected to the second connector. The caps may be arranged on the first connector and the second connector in a disconnected mode, without requiring major cleaning operations. The risks of deterioration of a fluid, electrical or optical connection as a result of pollution are therefore reduced.

Nesting one cap in the other in such a way is not at all obvious. However, the first connector may be a female connector receiving a male second connector. Therefore, at least in this case, the first connector may have external dimensions larger than the external dimensions of the second cap. Consequently, the first cap can define a first cavity suitable for receiving the second cap.

By way of illustration, the first connector and the second connector respectively have a substantially cylindrical shape having a large radius and a substantially cylindrical shape having a smaller radius. The same may apply to the first cap and to the second cap.

According to the disclosure, the first cap and the second cap can therefore be nested perfectly with each other so as not to gather any dirt or dust when they are not, or are no longer, in use protecting the first connector and the second connector.

Furthermore, since the first cap and the second cap have complementary shapes in order to nest with each other, connection operations can be foolproofed. If a cap protecting one connector does not nest with the other cap, at least one of the connectors is therefore not the correct connector to use. For example, an operator may attempt to connect a metal braid to the wrong metal braid, the cap of one metal braid not fitting over the cap of the other metal braid.

The protective assembly may comprise one or more of the following features, taken individually or in combination.

According to one possibility, in the connected mode, the second cap is nested in the first cap, head to tail.

The first cap and the second cap therefore protect each other.

According to one possibility compatible with the preceding possibility, the first cap may comprise a hollow part having an open first proximal end and a first distal end closed by a first bottom, the hollow portion having an open second proximal end and a second distal end closed by a second bottom, said hollow portion being inserted by its second proximal end into the hollow part in the connected mode.

The first bottom and the second bottom therefore face each other in the connected mode. Furthermore, the first cavity and the second cavity are isolated from an external environment.

According to one possibility compatible with the preceding possibilities, said first cap may be secured to a first fastener configured to be attached to the first connector or to a first link secured to the first connector, the second cap being secured to a second fastener configured to be attached to the second connector or to a second link secured to the second connector.

The first cap and the second cap are thus captive, being attached respectively to the first connector or the first link and to the second connector or the second link. The first cap and the second cap are connected directly or indirectly via the corresponding link to the first connector and to the second connector which they protect.

An operator does not run the risk of confusing the caps, because the caps are connected to the element that they are intended to protect. Furthermore, as indicated above, the caps help foolproof the connection of the associated connectors.

Where appropriate, the caps of an aircraft are not loose in flight, the caps being attached.

The first fastener and/or the second fastener may each comprise a chain, a cord, a synthetic wire, an elastically deformable band, etc.

The first fastener and/or the second fastener may each comprise a fixed or movable fastening system in order to be attached to the connector or the associated link. For example, such a fastening system may comprise a ring, a crimped or molded part, etc.

According to one possibility compatible with the preceding possibilities, the first cap and the second cap, and indeed the first fastener and the second fastener, may be made from a material chosen so as not to produce polluting particles.

According to one possibility compatible with the preceding possibilities, the first cap and the second cap, and indeed the first fastener and the second fastener, may comprise a shape memory material.

This material may tend to return to a specific shape either in the connected mode or in a disconnected mode in which the first cap covers the first connector and the second cap covers the second connector.

According to one example, the second cap may be compressed laterally in order to be inserted into the first cap in the connected mode, and returns to its original shape in the disconnected mode.

For example, the first cap and the second cap, and indeed the first fastener and the second fastener, may comprise a material from the rubber and elastomer group. Using these said material groups makes replacement easier in the event of wear.

According to one possibility compatible with the preceding possibilities, the second cap may comprise a positioning mark.

Such a positioning mark is intended to identify whether the second cap is inserted correctly into the first cap in the connected mode.

Such a positioning mark may comprise a colored sign, i.e., a sign of a different color to the second cap or indeed the first cap. Such a colored sign may include at least one line, at least one dot, etc.

Using connectors provided with a locking system and a cap having a positioning mark ensuring that the second cap nests correctly in the first cap helps obtain a robust system that can meet the requirements for use on aircraft.

For example, the positioning mark is concealed in the first cavity in the connected mode.

For example, said positioning mark is located outside the second cavity. Optionally, the casing 420 of the hollow portion of the second cap comprises this positioning mark.

According to one possibility compatible with the preceding possibilities, the first cap may comprise a first shape facing into the first cavity and said hollow portion comprises a second shape outside the second cavity, the second shape being shaped to match the first shape in order to hold the second cap in the first cap in the connected mode.

The first shape and the second shape can form snap-fit fastening means in order to prevent the first cap and the second cap from becoming separated in an untimely manner in the connected mode.

For example, the first shape has a groove and the second shape has a protuberance shaped to fit the groove, or vice versa. For example, the groove is not parallel to an axis along which the second cap is inserted into the first cap. In the connected mode, the protuberance penetrates into the groove in order to hold the first cap and the second cap nested with each other.

A connection system may additionally be provided with a first connector and a second connector as well as with a protective assembly according to the disclosure.

According to one possibility, the first cap may be attached to the first connector or to a first link secured to the first connector, said second cap being attached to the second connector or to a second link secured to the second connector.

According to one possibility compatible with the preceding possibility, the first connector may be in fluid, electrical or optical connection with a first link.

According to one possibility compatible with the preceding possibilities, the second connector may be in fluid, electrical or optical connection with a second link, or is a holder base.

According to one possibility compatible with the preceding possibilities, said first connector and said second connector can be connected to each other in a connected mode, said first connector being fitted into the first cap and said second connector being fitted into the second cap in a disconnected mode.

According to one possibility compatible with the preceding possibilities, said first connector and the second connector may comprise a locking system.

For example, such a locking system may comprise complementary screw threads and/or a bayonet system.

According to another embodiment, a vehicle may include a protective assembly according to the disclosure, and indeed a connection system according to the disclosure.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Figure 1:
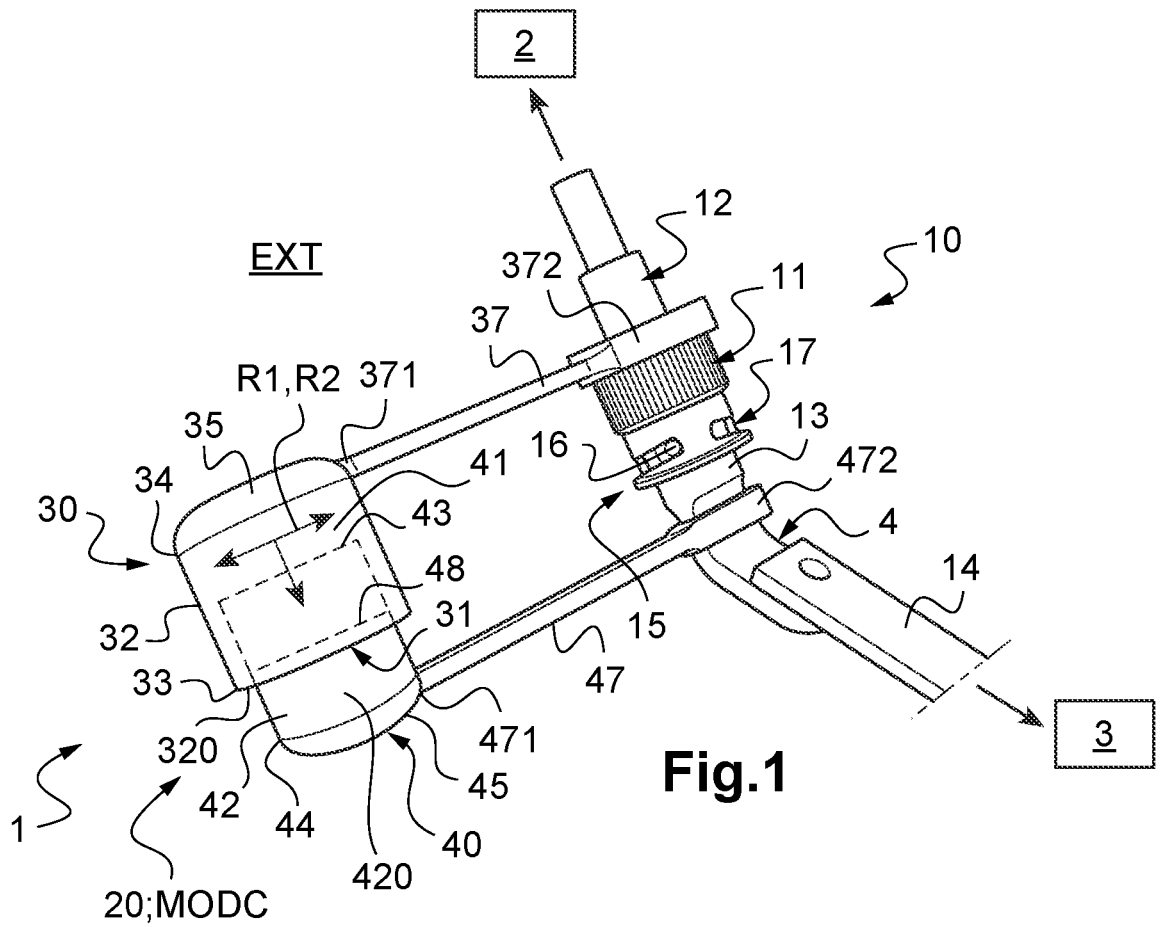
FIG. 1 is a diagram showing a connection system according to the disclosure in the connected mode, arranged in a vehicle, for example.

FIG. 1 shows an example of a protective assembly 1 according to the disclosure. This assembly 20 may be arranged in a connection system 10, and indeed within a vehicle 1. Such a vehicle 1 may be an aircraft, a land or sea vehicle, etc. Such an assembly 20 may more generally be used in various systems provided with a connection system 10.

Irrespective of the embodiment, a connection system 10 comprises a first connector 11 connected to a first link 12. The first link 12 may lead to a member 2. The first connector 11 may, for example, include at least one electrical conductor electrically connected to an electrical conductor of the first link 12 in order to convey electrical power or data, at least one light conductor connected to an optical fiber of the first link 12, at least one port through which an optical fiber of the first link 12 passes, or indeed at least one duct connected to a pipe of the first link 12 in order to convey a fluid.

The connection system 10 also comprises a second connector 13.

The second connector 13 may simply be configured to be fastened to the first connector 11. In this case, the second connector 13 may be a holder base 4 and may not communicate fluidically, optically or electrically with the first connector 11.

Alternatively, the second connector 13 may be connected to a second link 14. The second link 14 may lead to another connector connected to a member 3. The second connector 13 may, for example, include at least one electrical conductor electrically connected to an electrical conductor of the second link 14 and to an electrical conductor of the first connector 11 in a connected mode MODC in order to convey electrical power or data, at least one light conductor connected to an optical fiber of the second link 14 and to a light conductor of the first connector 11 in a connected mode MODC, at least one port through which an optical fiber of the second link 14 passes, at least one duct connected to a pipe of the first link 12 and to a duct of the first connector 11 in a connected mode MODC in order to convey a fluid.

Figure 9:
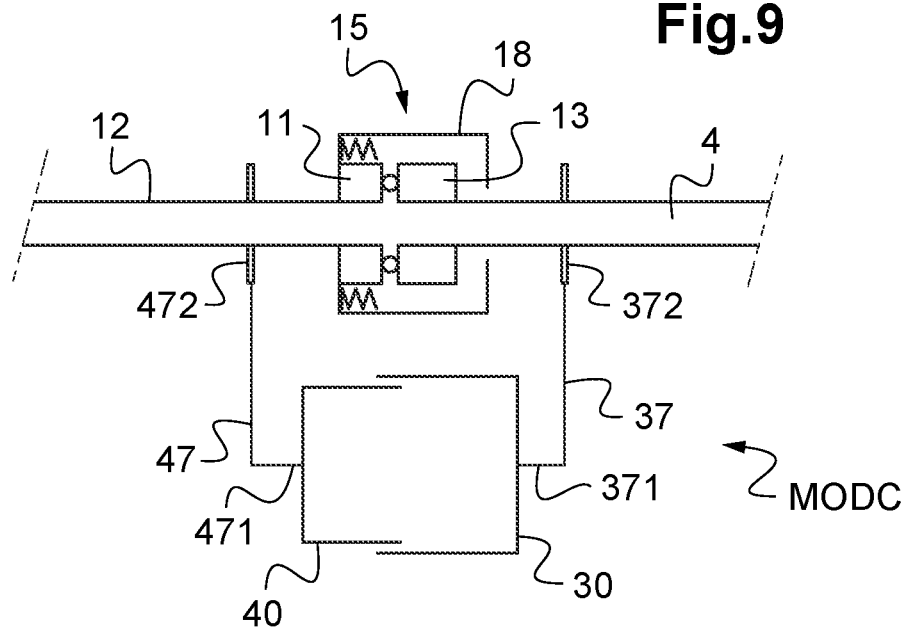
FIG. 9 is a diagram showing another example of a first cap, a second cap and first and second connectors.

For example, FIG. 1 shows electrical connectors whereas FIG. 9 shows fluid or optical connectors.

Moreover, the first connector 11 may be a female connector and the second connector 13 may be a male connector configured to penetrate into the female connector, or vice versa.

Irrespective of the nature of the first connector 11 and the second connector 13, the first connector 11 and the second connector 13 may comprise a locking system 15.

According to the example shown in FIG. 1, a locking system 15 may comprise a pin 16 of one connector and a bushing of the other connector provided with an L-shaped groove 17. The pin 16 and the bushing are able to rotate relative to each other. The pin 16 is pushed into one leg of the groove 17 and then rotated in order to immobilize the pin 16 in the other leg of the groove 17. The connector provided with the bushing is, for example, a male connector, and the connector provided with the pin 16 is a female connector.

According to the example shown in FIG. 9, the locking system 15 may comprise a threaded bushing 18 of one connector, the threaded bushing 18 being capable of being screwed to a tapping of the other connector. The connector provided with the bushing is a male connector, the other connector being a female connector.

These examples are given by way of illustration.

Irrespective of the nature of the first connector 11 and the second connector 13 and a locking system 15 that may be provided, the figures show various variants of a protective assembly 20 according to the disclosure.

Regardless of the variant and with reference to FIG. 1, a protective assembly 20 according to the disclosure comprises a hollow first cap 30 delimiting a first cavity 31 configured to house a first connector 11.

For example, the first cap 30 comprises a hollow part 32 that extends from a first proximal end 33 to a first distal end 34. The first proximal end 33 is open onto an external environment EXT while the first distal end 34 is closed by a first bottom 35. Consequently, the first cavity 31 is blind in the sense that it opens onto the external environment EXT only at the first proximal end 33. The hollow part 32 includes an inner wall 320 locally delimiting the first cavity 31. For example, the inner wall 320 is substantially cylindrical in shape and has a first radius R1.

Furthermore, the first cap 30 may be secured to a first fastener 37. The first fastener 37 extends from a first zone 371 to a second zone 372. The first zone 371 is fastened by conventional methods to the first cap 30, and, for example, to the first bottom 35. The second zone 372 is attached to the first connector 11 or to the first link 12. For example, the second zone 372 comprises a ring arranged around the first connector 11 or the first link 12.

The first cap 30 is optionally made from a shape memory material.

The first cap 30 and the first fastener 37 optionally form a one-piece component.

Figure 2:
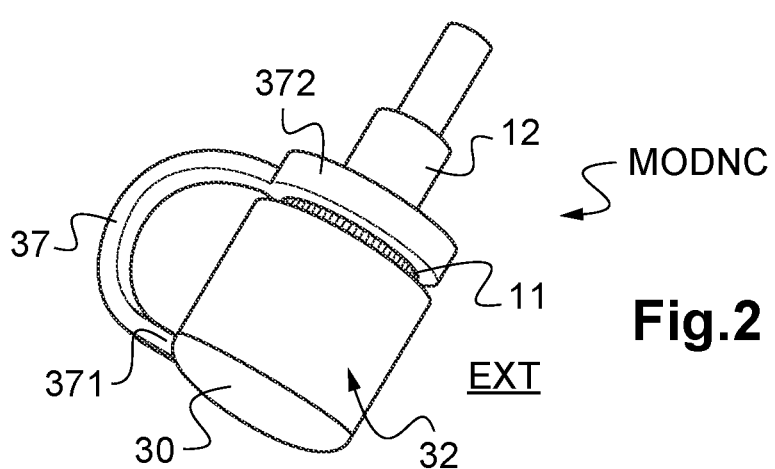
FIG. 2 is a three-dimensional view of a first cap in the disconnected mode.
Figure 3:
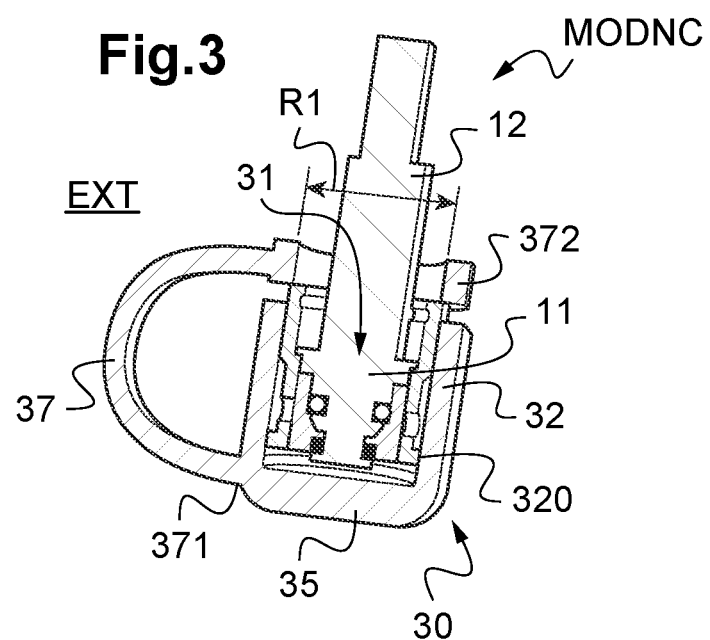
FIG. 3 is a cross-sectional view of FIG. 2.

Therefore, and with reference to FIGS. 2 and 3, in a disconnected mode MODNC, the hollow part 32 can be fitted over the first connector 11 in order to protect it from particles present in the external environment EXT. Then, when the first connector 11 is not in operation, the first cap 30 prevents foreign particles such as pebbles, dust particles, water or the like from penetrating into the elements of the first connector 11 capable of conveying an electric current, a fluid or light.

With reference to FIG. 1, the protective assembly 20 comprises a hollow second cap 40 delimiting a second cavity 41 configured to house the second connector 13.

For example, the second cap 40 comprises a hollow portion 42 that extends from a second proximal end 43 to a second distal end 44. The second proximal end 43 is open onto the external environment EXT while the second distal end 44 is closed by a second bottom 45. Consequently, the second cavity 41 is blind in the sense that it opens onto the external environment EXT only at the second proximal end 43. For example, the hollow portion 42 comprises an inner casing delimiting the second cavity 41 and an outer casing 420 facing the external environment EXT in the disconnected mode. For example, the outer casing 420 is substantially cylindrical in shape and has a second radius R2. The second radius R2 is optionally substantially equal to the first radius R1.

Furthermore, the second cap 40 may be secured to a second fastener 47. The second fastener 47 extends from a first section 471 to a second section 472. The first section 471 is fastened by conventional methods to the second cap 40, and, for example, to the second bottom 45. The second section 472 is attached to the second connector 13 or to the second link 14. For example, the second section 472 comprises a ring arranged around the second connector 13 or the second link 14.

The second cap 40 is optionally made from a shape memory material.

The second cap 40 and the second fastener 47 optionally form a one-piece component.

Figure 4:
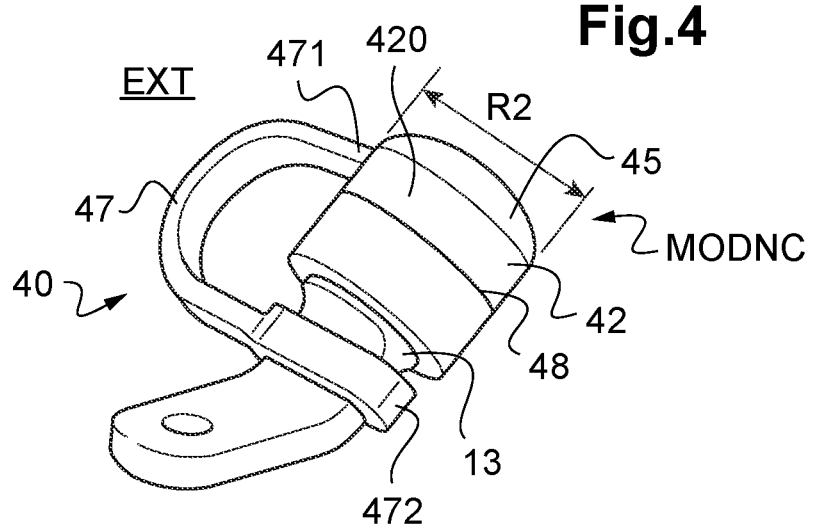
FIG. 4 is a three-dimensional view of a second cap in the disconnected mode.

As shown in FIG. 4, the second cap 40 may include a positioning mark 48 outside the second cavity 41. For example, the outer casing 420 of the portion 42 comprises this positioning mark.

Figure 5:
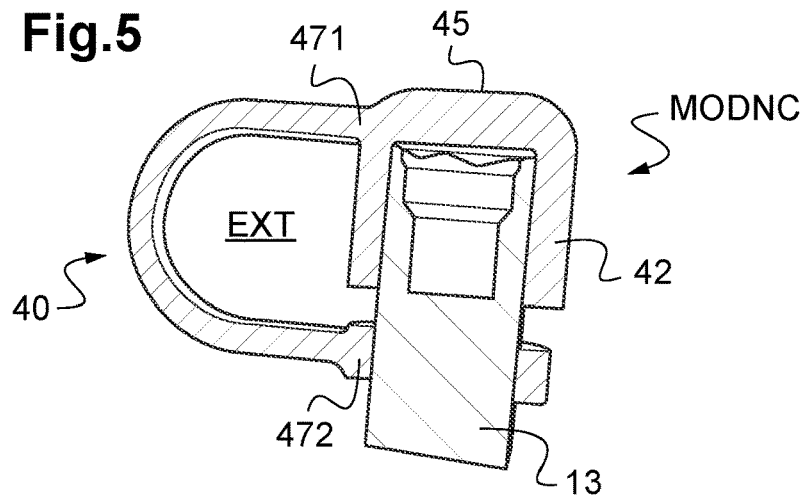
FIG. 5 is a cross-sectional view of FIG. 4.

Therefore, and with reference to FIGS. 4 and 5, in the disconnected mode MODNC, the hollow portion 42 can be fitted over the second connector 13 in order to protect it from particles present in the external environment EXT.

Then, when the second connector 13 is not in operation, the second cap 40 prevents foreign particles such as pebbles, dust particles, water or the like, if present, from penetrating into the elements of the second connector 13 capable of conveying an electric current, a fluid or light.

With reference to FIG. 1, the shape of the outer casing 420 of the hollow portion of the second cap matches the shape of the first cavity 31 and the inner wall 320 of the hollow part 32.

In the connected mode MODC shown in FIG. 1, the first connector 11 is linked/connected to the second connector 13. Moreover, the second cap 40, and in particular its hollow portion 42, penetrates into the first cavity 31 in sealed manner. The second cap 40 is nested in the first cap 30, head to tail.

More precisely, the outer casing 420 of the hollow portion 42 is inserted by its second proximal end 43 into the hollow part 32.

Consequently, the second cap 40 is arranged in the first cap 30 with a tight fit so as to prevent foreign particles from entering the first cap 30 and the second cap 40.

Optionally, the inner wall 320 of the hollow part 32 includes a seal and/or the outer casing 420 of the hollow portion 42 includes a seal in order to promote tight sealing between the first cap 30 and the second cap 40 in the connected mode.

If applicable, the second cap 40 is inserted into the first cap 30 until the positioning mark 48 is no longer visible.

Figure 6:
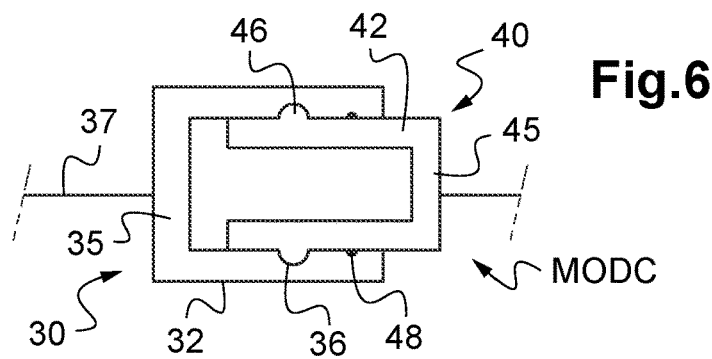
FIG. 6 is a cross-sectional view showing the first cap and the second cap of FIG. 1 in the connected mode.

With reference to FIG. 6, the first cap 30 may have a first shape 36 on its inner wall 320 facing into the first cavity 31. Similarly, the hollow portion 42 may comprise a second shape 46 on its outer casing 420 outside the second cavity 41. The second shape 46 may match the first shape 36 in order to hold the second cap 40 in the first cap 30 in the connected mode MODC. According to the example shown, the first shape 36 comprises an annular groove and the second shape 46 comprises a matching annular protuberance. The first shape 36 and the second shape 46 can therefore cooperate with each other and form reversible snap-fit fastening means. The reverse is also possible.

FIGS. 1 to 6 show an example of an assembly that can be adapted to an electrical connection system, for example.

Figure 7:
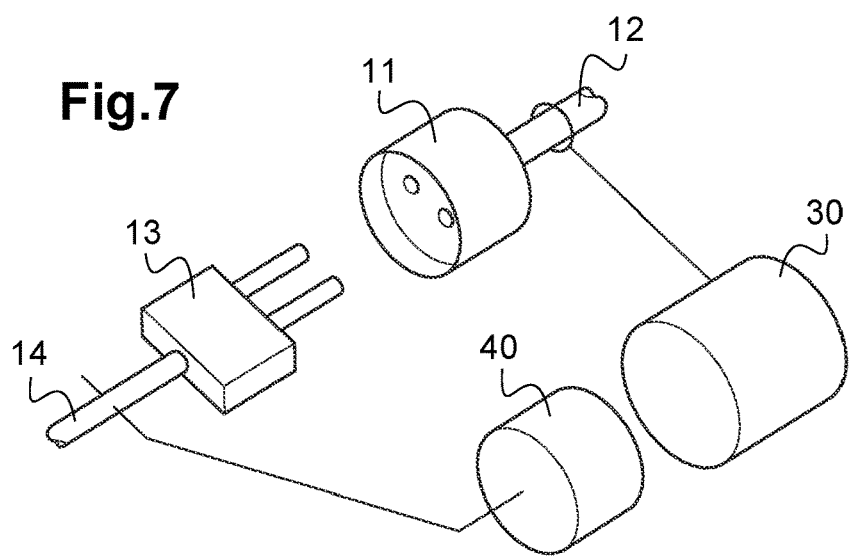
FIG. 7 is a diagram showing another example of a first cap, a second cap and first and second connectors.
Figure 8:
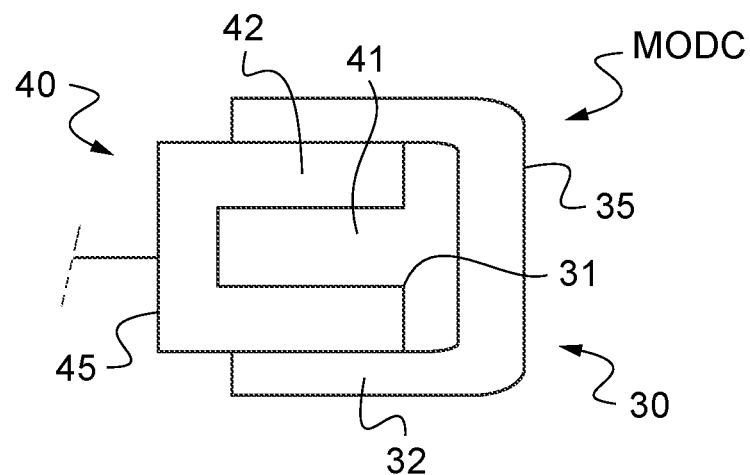
FIG. 8 is a cross-sectional view showing the first cap and the second cap of FIG. 7 in the connected mode.

FIGS. 7 and 8 show an assembly that can be adapted to a system having a first connector 11 of the cylindrical female electrical socket type and a second connector 13 of the flat male electrical plug type. The second cavity 41 is then adapted to the shape of this second connector 13.

FIG. 9 shows a fluid or optical connection system, for example.

The assembly according to the disclosure can therefore be adapted to various types of connectors.

Naturally, the present disclosure is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the present disclosure.

What is claimed is:

1. A protective assembly provided with a hollow first cap provided with a first cavity configured to house a first connector, the protective assembly being provided with a second cap, the second cap comprising a hollow portion delimiting a second cavity configured to house a second connector to be connected to the first connector,
    wherein the first cavity is shaped to match an outer casing of the hollow portion, the second cap penetrating into the first cavity in a sealed manner, in a connected mode, isolating the first cavity and the second cavity from an external environment; and
    wherein the second cap comprises a positioning mark, wherein the first cap comprises a first shape on an inner wall of the first cap facing into the first cavity and the hollow portion comprises a second shape on the outer casing outside the second cavity, the second shape being shaped to match the first shape in order to hold the second cap in the first cap in the connected mode.

2. The protective assembly according to claim 1, wherein, in the connected mode, the second cap is nested in the first cap, head to tail.

3. The protective assembly according to claim 1, wherein the first cap comprises a hollow part having an open first proximal end and a first distal end closed by a first bottom, the hollow portion having an open second proximal end and a second distal end closed by a second bottom, the hollow portion being inserted by its second proximal end into the hollow part in the connected mode.

4. The protective assembly according to claim 1, wherein the first cap is secured to a first fastener configured to be attached to the first connector or to a first link secured to the first connector, the second cap being secured to a second fastener configured to be attached to the second connector or to a second link secured to the second connector.

5. The protective assembly according to claim 1, wherein the first cap and the second cap comprise a shape memory material.

6. The protective assembly according to claim 1, wherein the positioning mark is concealed in the first cavity in the connected mode.

7. The protective assembly according to claim 1, wherein the positioning mark comprises a colored sign.

8. Protective assembly according to claim 1, wherein the positioning mark is located outside the second cavity.

9. A vehicle, wherein the vehicle comprises the protective assembly according to claim 1.

10. The protective assembly of claim 1, wherein the first shape comprises a groove, and the second shape comprises a protuberance.

11. The protective assembly of claim 1, wherein the first shape and the second shape are shaped to form a snap-fit connection when in the connected mode.

12. A connection system provided with a first connector and a second connector,
    wherein the connection system comprises the protective assembly according to claim 1.

13. The connection system according to claim 12, wherein the first cap is attached to the first connector or to a first link secured to the first connector, the second cap being attached to the second connector or to a second link secured to the second connector.

14. The connection system according to claim 12, wherein the first connector is in fluid, electrical or optical connection with a first link.

15. The connection system according to claim 12, wherein the second connector is in fluid, electrical or optical connection with a second link or is a holder base.

16. The connection system according to claim 12, wherein the first connector and the second connector are connected in a connected mode, the first connector being fitted into the first cap and the second connector being fitted into the second cap in a disconnected mode.

17. The connection system according to claim 12, wherein the first connector and the second connector comprise a locking system.

18. A protective assembly comprising:
    a hollow first cap having a first cavity configured to house a first connector;
    a second cap comprising a hollow portion delimiting a second cavity configured to house a second connector connectable with the first connector,
    the first cavity having a shape matching an outer casing of the hollow portion, the second cap penetrating into the first cavity in a sealed manner, in a connected mode, isolating the first cavity and the second cavity from an external environment; and
    wherein the outer casing comprises a positioning mark, wherein the first cap comprises a first shape on an inner wall of the first cap facing into the first cavity and the hollow portion comprises a second shape on the outer casing outside the second cavity, the second shape being shaped to match the first shape in order to hold the second cap in the first cap in the connected mode.

19. The protective assembly of claim 18, wherein the first cavity is dimensioned to be fitted over the first connector, and the second cavity is dimensioned to be fitted over the second connector.

* * * * *